United States Patent
Sekine et al.

(10) Patent No.: US 10,487,198 B2
(45) Date of Patent: Nov. 26, 2019

(54) RUBBER COMPOSITION AND PNEUMATIC TIRE USING SAME

(71) Applicant: The Yokohama Rubber Co., LTD., Minato-ku, Tokyo (JP)

(72) Inventors: Yuko Sekine, Hiratsuka (JP); Makoto Ashiura, Hiratsuka (JP); Ryosuke Sakai, Hiratsuka (JP); Fumito Yatsuyanagi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/735,152

(22) PCT Filed: Jun. 10, 2016

(86) PCT No.: PCT/JP2016/067426
§ 371 (c)(1),
(2) Date: Dec. 8, 2017

(87) PCT Pub. No.: WO2016/199913
PCT Pub. Date: Dec. 15, 2016

(65) Prior Publication Data
US 2018/0298166 A1    Oct. 18, 2018

(30) Foreign Application Priority Data

Jun. 12, 2015   (JP) .................................. 2015-119776

(51) Int. Cl.
| C08L 9/06 | (2006.01) |
| B60C 1/00 | (2006.01) |
| C08K 3/04 | (2006.01) |
| C08K 3/36 | (2006.01) |
| C08L 21/00 | (2006.01) |

(52) U.S. Cl.
CPC .............. *C08L 9/06* (2013.01); *B60C 1/0016* (2013.01); *C08K 3/04* (2013.01); *C08K 3/36* (2013.01); *C08L 21/00* (2013.01); *B60C 2001/0083* (2013.01); *C08L 2205/025* (2013.01); *C08L 2205/03* (2013.01)

(58) Field of Classification Search
CPC .. C08L 9/06; C08L 2205/03; C08L 2205/025; B60C 1/0016; B60C 2001/0083
See application file for complete search history.

(56) References Cited

U.S. PATENT DOCUMENTS

| 4,580,609 A * | 4/1986 | Nagata .................. B60C 1/0016 |
| | | 152/209.1 |
| 6,362,272 B1 * | 3/2002 | Tadaki .................. B60C 1/0016 |
| | | 524/493 |
| 2011/0301280 A1 | 12/2011 | Kushida |
| 2013/0172443 A1 | 7/2013 | Kushida et al. |
| 2014/0228480 A1 * | 8/2014 | Shiraishi ............... B60C 1/0016 |
| | | 523/156 |
| 2015/0126643 A1 | 5/2015 | Satou et al. |
| 2017/0121490 A1 | 5/2017 | Miyazaki |

FOREIGN PATENT DOCUMENTS

| CN | 102268150 | 12/2011 |
| CN | 102958990 | 3/2013 |
| CN | 104302696 | 1/2015 |
| JP | S57-179212 | 11/1982 |
| JP | H03-239737 | 10/1991 |
| JP | H07-300511 | * 11/1995 |
| JP | 2000-038423 | 2/2000 |
| JP | 2000-178378 | 6/2000 |
| JP | 2013-185090 | 9/2013 |
| JP | 2014-189648 | 10/2014 |
| JP | 2014-218566 | 11/2014 |
| JP | 2015-196759 | 11/2015 |
| WO | WO 2012/035998 | 3/2012 |
| WO | WO 2013/133432 | 9/2013 |
| WO | WO 2015/174229 | 11/2015 |

OTHER PUBLICATIONS

International Search Report for International Application No. PCT/JP2016/067426 dated Jul. 26, 2016, 4 pages, Japan.
Yasuyuki Tanaka et al., Determination of Sequence Length Distribution in SBR by Ozonolysis—.g.p.c. Method, Article, Jan. 23, 1981, vol. 22, pp. 1721-1723, Japan.
Yasuyuki Tanaka et al., Macromolecules, Feb. 28, 1983, Article, vol. 16, pp. 1925-1928, Japan.

* cited by examiner

*Primary Examiner* — Robert D Harlan
(74) *Attorney, Agent, or Firm* — Thorpe North & Western

(57) ABSTRACT

A rubber composition contains a diene rubber containing a styrene-butadiene copolymer component including a styrene-butadiene copolymer and a reinforcing filler. (1) The content of bonded styrene is from 5 to 50 wt. %. (2) The total content of styrene of an ozone decomposed component S1 including one styrene-derived unit and an ozone decomposed component S1V1 including one styrene-derived unit and one 1,2-bonded butadiene-derived unit is less than 80 wt. % of the amount of bonded styrene. The total content of styrene of the decomposed component S1V1 is less than 10 wt. % of the amount of bonded styrene. (3) The integrated intensity of an ozone decomposed component S1V2 including one styrene-derived unit and two 1,2-bonded butadiene-derived units is not less than 15% of the integrated intensity of all the decomposed components including styrene-derived units. (4) The vinyl content of a butadiene portion is not less than 20% and less than 50%.

8 Claims, 1 Drawing Sheet

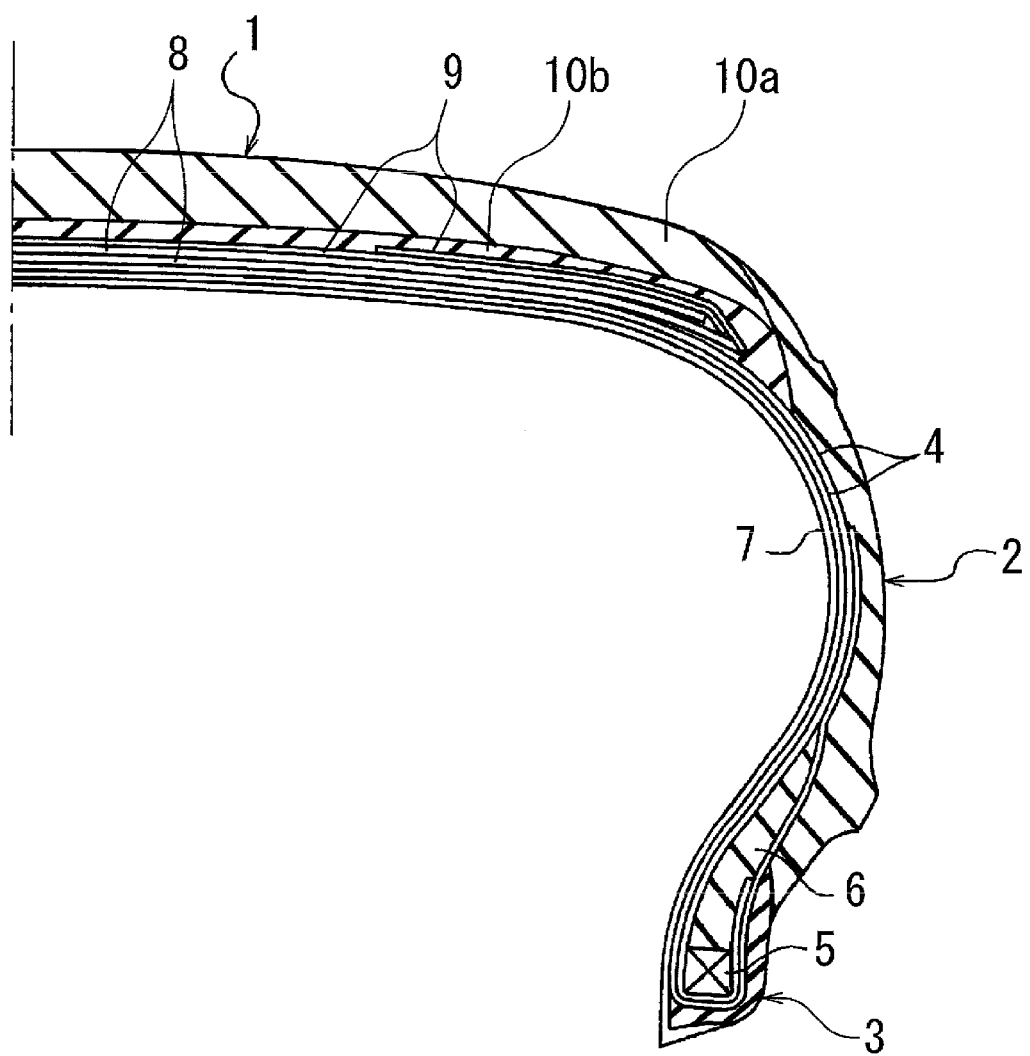

RUBBER COMPOSITION AND PNEUMATIC TIRE USING SAME

TECHNICAL FIELD

The present technology relates to a rubber composition that enhances rubber hardness and tensile stress equal to or beyond conventional levels, and a pneumatic tire using the same.

BACKGROUND ART

In recent years, there has been a demand for high wet grip performance and low rolling resistance in pneumatic tires. In order to satisfy these demands, there is a known technique of compounding a reinforcing filler such as a styrene-butadiene copolymer or silica with a rubber composition constituting a cap tread of a tire. In order to further enhance the wear resistance or rubber hardness of the rubber composition, it has been proposed to compound polybutadiene or a silica having high reactivity, for example, but in this case, there has been a problem in that the rubber strength decreases or the processability is diminished.

Japanese Unexamined Patent Application Publication No. 03-239737 describes that a pneumatic tire using a rubber composition prepared by compounding a silica and a styrene-butadiene copolymer having a specific arrangement of styrene-derived units for a tread simultaneously achieves wet skid resistance, rolling resistance, and wear resistance. However, this rubber composition could not necessarily satisfy the demands of consumers sufficiently due to a decrease in rubber strength. The rubber composition also could not enhance rubber hardness sufficiently.

Japanese Unexamined Patent Application Publication No. 57-179212 describes a styrene-butadiene copolymer in which a long-chain styrene block content is not greater than 5 wt. %, a simple chain content having one styrene-derived unit is not less than 50 wt. % relative to the total styrene content in the styrene-butadiene copolymer, and a total styrene content is from 10 to 30 wt. % of the styrene-butadiene copolymer content. However, the rubber composition described in Japanese Unexamined Patent Application Publication No. 57-179212 could not necessarily improve rubber hardness sufficiently.

SUMMARY

The present technology provides a rubber composition by which rubber hardness and tensile stress are enhanced to or beyond conventional levels.

The rubber composition of the present technology includes a diene rubber containing at least one type of styrene-butadiene copolymer and a reinforcing filler, wherein a styrene-butadiene copolymer component including the at least one type of styrene-butadiene copolymer has the characteristics of (1) to (4):

(1) a content of bonded styrene is from 5 to 50 wt. %;

(2) when a decomposed component S1 including one styrene-derived unit and a decomposed component S1V1 including one styrene-derived unit and one 1,2-bonded butadiene-derived unit are measured by gel permeation chromatography as decomposed components obtained by ozone decomposition, a total content of styrene of the decomposed component S1 and the decomposed component S1V1 is less than 80 wt. % of the amount of bonded styrene, and a total content of styrene of the decomposed component S1V1 is less than 10 wt. % of the amount of bonded styrene;

(3) when the decomposed components obtained by ozone decomposition are measured by a liquid chromatography-mass spectrometer, an integrated intensity of a decomposed component S1V2 including one styrene-derived unit and two 1,2-bonded butadiene-derived units is not less than 15% of an integrated intensity of all the decomposed components including styrene-derived units; and (4) a vinyl content of a butadiene portion is not less than 20% and less than 50%.

In accordance with the configuration described above, the rubber composition of the present technology contains a diene rubber including a styrene-butadiene copolymer component and a reinforcing filler, wherein the styrene-butadiene copolymer component satisfies that (1) the content of bonded styrene is from 5 to 50 wt. %; (2) the total content of styrene of an ozone decomposed component S1 including one styrene-derived unit and an ozone decomposed component S1V1 including one styrene-derived unit and one 1,2-bonded butadiene-derived unit is less than 80 wt. % of the amount of bonded styrene, and the total content of styrene of the ozone decomposed component S1V1 is less than 10 wt. % of the amount of bonded styrene; (3) the integrated intensity of an ozone decomposed component S1V2 including one styrene-derived unit and two 1,2-bonded butadiene-derived units is not less than 15% of the integrated intensity of all decomposed components including styrene-derived units; and (4) the vinyl content of a butadiene portion is not less than 20% and less than 50%. Thus, the rubber composition of the present technology can achieve and enhance rubber hardness and tensile stress to or beyond conventional levels.

The diene rubber may contain at least one type selected from natural rubber, polyisoprene, and polybutadiene. The reinforcing filler may be at least one type selected from silica and carbon black.

The rubber composition described above is suitable for use in a pneumatic tire and is particularly preferably used in a cap tread. Such a pneumatic tire has higher rubber hardness and tensile stress, and thus, the steering stability is excellent.

BRIEF DESCRIPTION OF DRAWING

FIG. 1 is a partial cross-sectional view in a tire meridian direction that illustrates an example of an embodiment of a pneumatic tire in which a rubber composition of the present technology is used.

DETAILED DESCRIPTION

FIG. 1 is a cross-sectional view that illustrates an example of an embodiment of a pneumatic tire in which a rubber composition is used. The pneumatic tire includes a tread portion 1, a sidewall portion 2, and a bead portion 3.

In FIG. 1, two carcass layers 4, formed by arranging reinforcing cords extending in a tire circumferential direction at a predetermined pitch and embedding these reinforcing cords in a rubber layer, are disposed extending between left and right bead parts 3. Both ends of the carcass layers 4 are made to sandwich a bead filler 6 and are folded back around a bead core 5 that is embedded in the bead parts 3 in a tire axial direction from the inside to the outside. An innerliner 7 is disposed inward of the carcass layers 4. Two layers of a belt layer 8, formed by arranging reinforcing cords extending inclined to the tire circumferential direction in the tire axial direction at a predetermined pitch and embedding these reinforcing cords in a rubber layer, is disposed on an outer circumferential side of the carcass layers 4 of the tread portion 1. The reinforcing cords of the two layers of a belt layer 8 are inclined with respect to the tire circumferential direction, and the direction of the cords of the different layers have an opposite orientation and cross each other. A belt cover layer 9 is disposed outward of the belt layers 8. The tread portion 1 is formed from tread rubber layers 10*a* and 10*b* on the outer circumferential side of the belt cover layer 9. The tread rubber layers 10*a* and 10*b* are a cap tread and a base tread and are preferably made of the rubber composition of the present technology.

The rubber composition of the present technology includes a diene rubber and a reinforcing filler. The diene rubber includes at least one type of styrene-butadiene copolymer. In the present specification, a polymer component including at least one type of styrene-butadiene copolymer may be referred to as "styrene-butadiene copolymer component". In the present technology, the styrene-butadiene copolymer component satisfies all of the characteristics of (1) to (4) below:

(1) the content of bonded styrene is from 5 to 50 wt. %;

(2) when a decomposed component S1 including one styrene-derived unit and a decomposed component S1V1 including one styrene-derived unit and one 1,2-bonded butadiene-derived unit are measured by gel permeation chromatography (GPC) as decomposed components obtained by ozone decomposition, the total content of styrene of the decomposed component S1 and the decomposed component S1V1 is less than 80 wt. % of the amount of bonded styrene, and the total content of styrene of the decomposed component S1V1 is less than 10 wt. % of the amount of bonded styrene;

(3) when the decomposed components obtained by ozone decomposition are measured by a liquid chromatography-mass spectrometer, the integrated intensity of a decomposed component S1V2 including one styrene-derived unit and two 1,2-bonded butadiene-derived units is not less than 15% of the integrated intensity of all the decomposed components including styrene-derived units; and (4) the vinyl content of a butadiene portion is not less than 20% and less than 50%.

When the styrene-butadiene copolymer component consists of a single styrene-butadiene copolymer, the single styrene-butadiene copolymer needs to satisfy all of the characteristics of (1) to (4) described above.

In addition, when the styrene-butadiene copolymer component includes a blend of a plurality of styrene-butadiene copolymers, the styrene-butadiene copolymer component needs to satisfy all of the characteristics of (1) to (4) described above as a whole. As long as the styrene-butadiene copolymer component satisfies the characteristics of (1) to (4) as a whole, each styrene-butadiene copolymer constituting the blend may or may not satisfy all of the characteristics of (1) to (4) described above. Each of the styrene-butadiene copolymers constituting the blend preferably satisfy all of the characteristics of (1) to (4). The styrene-butadiene copolymer component including two or more types of styrene-butadiene copolymers which satisfy all of the characteristics of (1) to (4) can enhance rubber hardness and tensile stress of the rubber composition. Note that in the present specification, the tensile stress refers to tensile stress at 100% elongation in a tensile test in accordance with JIS (Japanese Industrial Standard) K6251.

In the present technology, the styrene-butadiene copolymer component satisfies that (1) the content of bonded styrene is from 5 to 50 wt. % and preferably from 10 to 40 wt. %. The styrene-butadiene copolymer component having a styrene content within such a range can enhance the balance between the wear resistance and rubber strength of the rubber composition and the wet skid characteristics. This makes it possible to obtain a rubber composition which solves the problem of the present technology. When the styrene content of the styrene-butadiene copolymer component is less than 5 wt. %, the wet skid characteristics, wear resistance, and rubber strength may be deteriorated. When the styrene content of the styrene-butadiene copolymer component exceeds 50 wt. %, the glass transition temperature (Tg) of the styrene-butadiene copolymer component may increase, the balance of viscoelastic characteristics may be impaired, and the effect of reducing heat build-up may become difficult to achieve. That is, the balance between hysteresis loss and wet skid characteristics is diminished. Note that the styrene content of the styrene-butadiene copolymer component is measured by $^1$H-NMR.

The styrene-butadiene copolymer component used in the present technology satisfies that (2) when an ozone decomposed component S1 including one styrene-derived unit and an ozone decomposed component S1V1 including one styrene-derived unit and one 1,2-bonded butadiene-derived unit are measured by gel permeation chromatography (GPC) as decomposed components obtained by ozone decomposition, the total content of styrene of the ozone decomposed component S1 and the ozone decomposed component S1V1 is less than 80 wt. % of the amount of bonded styrene, and the total content of styrene of the ozone decomposed component S1V1 is less than 10 wt. % of the amount of bonded styrene.

The styrene-butadiene copolymer is a copolymer of styrene and butadiene and includes repeating units of styrene (styrene units) and repeating units of butadiene (butadiene units). The butadiene units include a portion in which butadiene is polymerized via 1,2-bonds (repeating units of ethylene having a vinyl group in a side chain) and a portion in which butadiene is polymerized via 1,4-bonds (repeating units of divalent groups of 2-butylene). In addition, the portion polymerized via 1,4-bonds includes repeating units with a trans-2-butylene structure and repeating units with a cis-2-butylene structure.

When the styrene-butadiene copolymer is subjected to ozone decomposition, the portion polymerized via 1,4-bonds is cleaved. In addition, the vinyl group of the side chain is oxidized to form a hydroxymethyl group. As a result, the repeating units interposed between two adjacent butadiene units polymerized via 1,4-bonds in the styrene-butadiene copolymer are produced as ozone decomposed components. For example, when a portion in which only one styrene unit in the main chain is interposed between two butadiene units polymerized via 1,4-bonds is subjected to ozone decomposition, a compound represented by the general formula (I) below is produced. In the present specification, the compound represented by the general formula (I) refers to "ozone decomposed component S1".

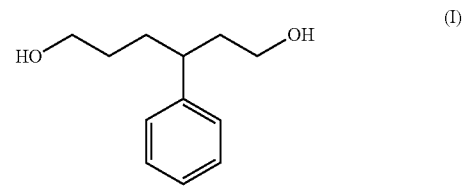

(I)

In addition, when a portion in which one styrene unit in the main chain and one butadiene unit polymerized via a 1,2-bond are interposed between adjacent butadiene units polymerized via 1,4-bonds is subjected to ozone decomposition, compounds represented by the general formulas (II) and (III) below are produced. In the present specification, the compounds represented by the general formulas (II) and (III) refer to "ozone decomposed components S1V1".

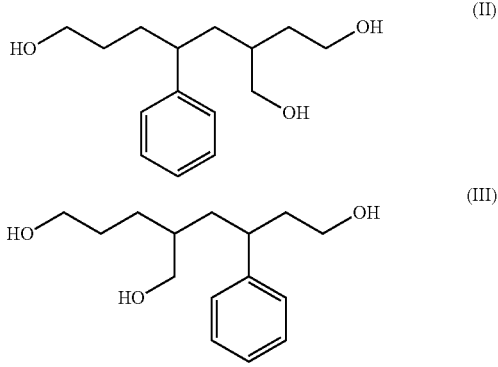

Further, when a portion in which one styrene unit in the main chain and two butadiene units polymerized via 1,2-bonds are interposed between adjacent butadiene units polymerized via 1,4-bonds is subjected to ozone decomposition, compounds represented by the general formulas (IV) to (VI) below are produced. In the present specification, the compounds represented by the general formulas (IV) to (VI) refer to "ozone decomposed components S1V2".

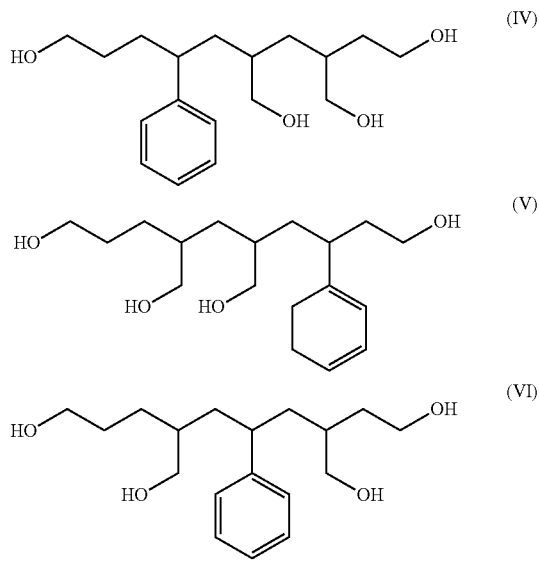

The portion interposed between two adjacent butadiene units polymerized via 1,4-bonds as described above is produced by ozone decomposition as a decomposed component, in which a styrene-derived unit and/or a 1,2-bonded butadiene-derived unit are interposed between hydroxyethyl groups at both terminals. In addition, 1,4-butanediol is produced from repeating portions having two or more consecutive butadiene units polymerized via 1,2-bonds.

When the decomposed components obtained by ozone decomposition are measured by gel permeation chromatography (GPC) in the styrene-butadiene copolymer component used in the present technology, the total content of styrene of the ozone decomposed component S1 and the ozone decomposed component S1V1 is less than 80 wt. %, preferably less than 70 wt. %, more preferably from 20 to 50 wt. %, and even more preferably from 35 to 65 wt. % of the amount of bonded styrene. Here, decomposed components including one styrene-derived unit refers to the ozone decomposed component S1 consisting of only one styrene-derived unit and the ozone decomposed component S1V1 including one styrene-derived unit and one 1,2-bonded butadiene-derived unit as described above. The number of moles of the styrene-derived units in each decomposed component is determined by measuring the ozone decomposed components by gel permeation chromatography (GPC). The weight of styrene in each ozone decomposed component is calculated on the basis of the number of moles of styrene-derived units. The total content of styrene of the ozone decomposed components S1 and S1V1 thus determined needs to be less than 80 wt. % of the amount of bonded styrene. Such a composition exhibits excellent wear resistance.

In addition to the above description, when the decomposed components obtained by ozone decomposition are measured by gel permeation chromatography (GPC) in the styrene-butadiene copolymer component used in the present technology, the total content of styrene of the decomposed component S1V1 including one styrene-derived unit and one 1,2-bonded butadiene-derived unit is less than 10 wt. % and preferably not less than 3 wt. % and less than 10 wt. % of the amount of bonded styrene. Here, the ozone decomposed component S1V1 is an ozone decomposed component including only one styrene-derived unit and one 1,2-bonded butadiene-derived unit as described above, and corresponds to the decomposed components represented by the general formulas (II) and (III). The number of moles of the decomposed components represented by the general formulas (II) and (III) is determined by measuring the ozone decomposed components by gel permeation chromatography (GPC), and the weight of styrene is calculated on the basis of the number of moles. The content of styrene of the ozone decomposed component including one styrene-derived unit and one 1,2-bonded butadiene-derived unit needs to be less than 10 wt. % of the amount of bonded styrene. Such a composition exhibits excellent rubber hardness and tensile stress.

In the present specification, the ozone decomposition of the styrene-butadiene copolymer component and the measurement of ozone decomposed products are performed according to the methods described in Tanaka, et al., Polymer, 22, 1721 (1981) and Macromolecules, 16, 1925 (1983). Note that in the analysis method described in Tanaka, et al., the total of general formulas (I), (II), and (III) described above is defined as "styrene simple chain". In contrast, as described above, the present technology focuses on the total content of the ozone decomposed component S1 including only one styrene-derived unit and the ozone decomposed component S1V1 including one styrene-derived unit and one 1,2-bonded butadiene-derived unit (S1+S1V1; total decomposed components represented by the general formulas (I), (II), and (III) above) and the decomposed component including one styrene-derived unit and one 1,2-bonded butadiene-derived unit (S1V1; decomposed components represented by the general formulas (II) and (III) above), and performs analysis separately.

In the present specification, the conditions for measuring the ozone decomposed components by gel permeation chromatography (GPC) may be as follows.

Measurement instrument: LC-9104 (manufactured by Japan Analytical Industry Co., Ltd.)

Columns: two of each of JAIGEL-1H and JAIGEL-2H (both manufactured by Japan Analytical Industry Co., Ltd.) connected in series Detectors: UV Detector 3702 (manufactured by Japan Analytical Industry Co., Ltd.)

Differential refractometer RI Detector RI-7 (manufactured by Japan Analytical Industry Co., Ltd.)

Eluent: chloroform

Column temperature: room temperature

The styrene-butadiene copolymer component used in the present technology satisfies that (3) when the decomposed components obtained by ozone decomposition are measured by a liquid chromatography-mass spectrometer (LCMS), the integrated intensity of a decomposed component S1V2 including one styrene-derived unit and two 1,2-bonded butadiene-derived units is not less than 15%, and preferably from 15 to 40% of the integrated intensity of all the decomposed components including styrene-derived units. Excellent rubber hardness and tensile stress can be achieved when the integrated intensity of the decomposed component S1V2 is not less than 15%. Here, the decomposed component S1V2 including one styrene-derived unit and two 1,2-bonded butadiene-derived units is the ozone decomposed component consisting only of one styrene-derived unit and two 1,2-bonded butadiene-derived units as described above, and corresponds to the decomposed components represented by the general formulas (IV), (V), and (VI) above. The integrated intensities of peaks specific to decomposed components having the molecular weights of general formulas (IV), (V), and (VI) are determined by measuring these decomposed components using a liquid chromatography-mass spectrometer (LCMS).

The integrated intensity of each decomposed component can be determined using the following measurement method and analysis method. The molecules of each decomposed component can be detected in the state of a sodium adduct ion, and each mass chromatogram can be extracted on the basis of the mass spectrum thereof. In the case of the decomposed component S1V2 including one styrene-derived unit and two 1,2-bonded butadiene-derived units, the mass spectrum of a sodium adduct ion is at 333.21. In the mass chromatogram at 333.21, the peak for the decomposed component S1V2 can be confirmed, and the integrated intensity A[S1V2] is determined. Similarly, the integrated intensities for all other decomposed components including styrene-derived units are determined, and the sum A[total] is determined. The ratio of the integrated intensity A[S1V2] of the ozone decomposed component S1V2 including one styrene-derived unit and two 1,2-bonded butadiene-derived units to the sum A[total] of the integrated intensities of all the decomposed components including styrene-derived units is calculated from the equation A[S1V2]/ A[total]×100.

In the present specification, the conditions for measuring the ozone decomposed components by a liquid chromatography-mass spectrometer (LCMS) may be as follows.

Liquid chromatograph: Alliance 2695 (manufactured by Waters)

Mass spectrometer: ZQ2000 (manufactured by Waters)

Column: Hydrosphere C18 (manufactured by YMC, inner diameter: 2.0 mm, length: 150 mm, particle size: 3 µm)

Injection rate: 5 µL (approximately 10 mg/mL)

Mobile phase A: water

Mobile phase B: methanol

Flow rate: 0.2 mL/min

Time program: B conc. 20% (0 min)→100% (35 min)→100% (50 min)

Ion source temperature: 120° C.

Desolvent temperature: 350° C.

Cone voltage: 40 V

Ionization method: (ESI positive mode)

Mass spectrometry conditions: Scan measurement, mass range: m/z 50-2000

The styrene-butadiene copolymer component used in the present technology satisfies that (4) the vinyl content of the butadiene portion is not less than 20% and less than 50%. When the vinyl content of the butadiene portion in the styrene-butadiene copolymer component is not less than 20%, the rubber hardness can be maintained and the balance between the wet skid characteristics and rolling resistance can be enhanced. When the vinyl content of the butadiene portion in the styrene-butadiene copolymer component is less than 50%, the balance between rubber hardness and tensile stress can be achieved and enhanced to or beyond conventional levels. Note that the vinyl content of the butadiene portion is measured by $^1$H-NMR.

The content of the styrene-butadiene copolymer component having the characteristics of (1) to (4) is preferably not less than 40 wt. %, more preferably from 60 to 100 wt. %, and even more preferably from 80 to 100 wt. % out of 100 wt. % of the diene rubber. When the content of the styrene-butadiene copolymer component specified by characteristics (1) to (4) is not less than 40 wt. %, the balance between rubber hardness and tensile stress of the rubber composition can be achieved and enhanced to or beyond conventional levels.

The styrene-butadiene copolymer component specified by characteristics (1) to (4) can be prepared by using a single styrene-butadiene copolymer or by combining a plurality of styrene-butadiene copolymers. In general, the chain structure of a styrene-butadiene copolymer synthesized by a solution polymerization method can be controlled, and the characteristics (1) to (4) can be easily adjusted by the polymerization temperature at the time of synthesis, the timing of introducing monomers, the types and amounts of randomizers, and the like. In addition, when an existing styrene-butadiene copolymer is blended, the styrene-butadiene copolymer component having characteristics (1) to (4) can be prepared by combining a plurality of solution-polymerized styrene-butadiene copolymers having controllable chain structures and combining an emulsion-polymerized styrene-butadiene copolymer primarily having a random structure and one or more solution-polymerized styrene-butadiene copolymers.

The rubber composition of the present technology may include other diene rubbers in addition to a styrene-butadiene copolymer component satisfying all of the characteristics (1) to (4). Examples of other diene rubbers include natural rubber (NR), polyisoprene rubber (IR), polybutadiene rubber (low-cis BR), high-cis BR, high-trans BR (trans-bond content of the butadiene portion: 70 to 95%), styrene-isoprene copolymer rubber, butadiene-isoprene copolymer rubber, solution-polymerized random styrene-butadiene-isoprene copolymer rubber, emulsion-polymerized random styrene-butadiene-isoprene copolymer rubber, emulsion-polymerized styrene-acrylonitrile-butadiene copolymer rubber, acrylonitrile-butadiene copolymer rubber, high-vinyl SBR/low-vinyl SBR block copolymer rubber, polyisoprene-SBR block copolymer rubber, and polystyrene-polybutadiene-polystyrene block copolymers.

The content of the other diene rubber is preferably not greater than 60 wt. %, more preferably from 0 to 40 wt. %, and even more preferably from 0 to 20 wt. % out of 100 wt. % of the diene rubber. Various physical properties such as rubber hardness and tensile stress can be improved by the rubber composition containing the other diene rubbers.

The rubber composition of the present technology contains a diene rubber and a reinforcing filler. Examples of reinforcing fillers include inorganic fillers such as carbon black, silica, clay, aluminum hydroxide, calcium carbonate, mica, talc, aluminum hydroxide, aluminum oxide, titanium oxide, and barium sulfate and organic fillers such as cellulose, lecithin, lignin, and dendrimer. Of these, it is preferable to compound at least one type selected from carbon black and silica.

Excellent wear resistance, rubber hardness, and tensile stress of the rubber composition can be achieved by compounding carbon black into a rubber composition. The compounded content of the carbon black is not particularly limited but is preferably from 10 to 100 parts by weight and more preferably from 25 to 80 parts by weight per 100 parts by weight of the diene rubber.

Carbon black such as furnace black, acetylene black, thermal black, channel black, and graphite may be compounded. Of these, furnace black is preferable, and specific examples thereof include SAF, ISAF, ISAF-HS, ISAF-LS, IISAF-HS, HAF, HAF-HS, HAF-LS, and FEF. These carbon blacks may each be used alone, or two or more types may be used in combination. In addition, a surface-treated carbon black obtained by chemically modifying these carbon blacks with various acid compounds or the like may also be used.

In addition, compounding silica with the rubber composition makes it possible to obtain a rubber composition exhibiting excellent low heat build-up and wet grip performance. The compounded content of the silica is not particularly limited but is preferably from 10 to 150 parts by weight and more preferably from 40 to 100 parts by weight per 100 parts by weight of the diene rubber.

Any silica regularly used in rubber compositions for a tire tread such as wet silica, dry silica, carbon-silica in which silica is supported on a carbon black surface (dual-phase filler), or silica surface-treated with a compound which is reactive or compatible with both silica and rubber such as a silane coupling agent or polysiloxane is used as the silica. Of these, a wet silica containing hydrous silicic acid as a main component is preferable.

In the present technology, the compounded content of the reinforcing filler including silica and/or carbon black is preferably from 10 to 150 parts by weight and more preferably from 40 to 100 parts by weight per 100 parts by weight of the diene rubber. When the compounded content of the reinforcing filler is less than 10 parts by weight, the reinforcing performance cannot be sufficiently obtained, and the rubber hardness and tensile strength at break become insufficient. When the compounded content of the reinforcing filler exceeds 150 parts by weight, the heat build-up of the rubber composition increases while the tensile elongation at break decreases. Moreover, the wear resistance and processability are also diminished.

A silane coupling agent is preferably compounded with the rubber composition of the present technology together with silica in that the low heat build-up and wear resistance are further enhanced. The rubber composition containing a silane coupling agent together with silica enhances dispersibility of the silica, and further increase the reinforcing action with the diene rubber. The compounded content of the silane coupling agent is preferably from 2 to 20 wt. % and more preferably from 5 to 15 wt. % of the compounded amount of the silica. When the compounded content of the silane coupling agent is less than 2 wt. % of the weight of the silica, the effect of improving the dispersibility of the silica cannot be sufficiently obtained. Additionally, when the compounded content of the silane coupling agent exceeds 20 wt. %, the diene rubber component tends to be easily gelified, so the desired effects cannot be achieved.

The silane coupling agent is not particularly limited, but a sulfur-containing silane coupling agent is preferable, and examples thereof include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, mercaptosilane compounds and the like described in JP-2006-249069 A such as 3-mercaptopropyltrimethoxysilane, 3-mercaptopropyldimethoxymethylsilane, 3-mercaptopropyldimethylmethoxysilane, 2-mercaptoethyltriethoxysilane, 3-mercaptopropyltriethoxysilane, and VP Si363 manufactured by Evonik, 3-trimethoxysilylpropylbenzothiazole tetrasulfide, 3-triethoxysilylpropylbenzothiazolyl tetrasulfide, 3-triethoxysilylpropylmethacrylate monosulfide, 3-trimethoxysilylpropylmethacrylate monosulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, bis(3-diethoxymethylsilylpropyl)tetrasulfide, dimethoxymethylsilylpropyl-N,N-dimethylthiocarbamoyl tetrasulfide, dimethoxymethylsilylpropylbenzothiazolyl tetrasulfide, 3-octanoylthiopropyltriethoxysilane, 3-propionylthiopropyltrimethoxysilane, vinyl trimethoxysilane, vinyl triethoxysilane, vinyl tris(2-methoxyethoxy)silane, 3-glycidoxypropyltrimethoxysilane, 3-glycidoxypropylmethyldimethoxysilane, β-(3,4-epoxycyclohexyl)ethoxytrimethoxysilane, 3-aminopropyltrimethoxysilane, N-(β-aminoethyl)-γ-aminopropyltrimethoxysilane, and N-(β-aminoethyl)-γ-aminopropylmethyldimethoxysilane. In addition, the silane coupling agent may be an organosilicon compound, and examples of organosilicon compounds include polysiloxanes, silicone oils into which one or more organic groups such as an amino group, an epoxy group, a carbinol group, a mercapto group, a carboxyl group, a hydrogen group, a polyether group, a phenol group, a silanol group, an acrylic group, a methacrylic group, or a long-chain alkyl group are introduced into a side chain, both terminals, one terminal, or a side chain and both terminals of a polysiloxane, and silicone oligomers obtained by performing a condensation reaction on one or more type of organic silanes. Of these, bis-(3-triethoxysilylpropyl)tetrasulfide and bis(3-(triethoxysilyl)propyl) disulfide are preferable.

In addition to the components described above, the rubber composition of the present technology may also include various compounding agents that are commonly used in rubber compositions for a tire tread. Examples thereof include vulcanizing or cross-linking agents, vulcanization accelerators, anti-aging agents, processing aids, plasticizers, liquid polymers, thermosetting resins, thermoplastic resins, and the like. These compounding agents are kneaded by a common method to obtain a rubber composition that can be used for vulcanization or cross-linking. These compounding agents can be compounded in conventional general amounts so long as the performance of the present technology is not hindered. The rubber composition for a tire tread can be prepared by mixing the above-mentioned components using a well-known rubber kneading machine such as a Banbury mixer, a kneader, or a roller.

The vulcanizing or cross-linking agent is not particularly limited, but examples thereof include sulfur such as powdered sulfur, precipitated sulfur, colloidal sulfur, insoluble sulfur, and highly dispersible sulfur; halogenated sulfur such as sulfur monochloride and sulfur dichloride; and organic peroxides such as dicumyl peroxide and di-tert-butyl peroxide. Of these, sulfur is preferable, and powdered sulfur is particularly preferable. These vulcanizing or cross-linking agents may each be used alone, or two or more types may be used in combination. The compounding ratio of the vulcanizing agent is ordinarily from 0.1 to 15 parts by weight, preferably from 0.3 to 10 parts by weight, and even more preferably from 0.5 to 5 parts by weight per 100 parts by weight of the diene rubber.

The vulcanization accelerator is not particularly limited, but examples thereof include sulfenamide-based vulcanization accelerators such as N-cyclohexyl-2-benzothiazylsulfenamide, Nt-butyl-2-benzothiazolsulfenamide, N-oxyethylene-2-benzothiazolsulfenamide, and N,N'-diisopropyl-2-benzothiazolsulfenamide; guanidine-based vulcanization accelerators such as diphenylguanidine, di-o-tolylguanidine, and o-tolylbiguanidine; thiourea-based vulcanization accelerators such as diethylthiourea; thiazole-based vulcanization accelerators such as 2-mercaptobenzothiazole, dibenzothiazyldisulfide, and 2-mercaptobenzothiazole zinc salt; thiuram-based vulcanization accelerators such as tetramethylthiuram monosulfide and tetramethylthiuram disulfide; dithiocarbamic acid-based vulcanization accelerators such as sodium dimethyldithiocarbamate and zinc diethyldithiocarbamate; and xanthogenic acid-based vulcanization accelerators such as sodium isopropylxanthate, zinc isopropylxanthate, and zinc butylxanthate. Of these, it is particularly preferable to contain a sulfenamide-based vulcanization accelerator. These vulcanization accelerators may each be used alone, or two or more types may be used in combination. The compounded content of the vulcanization accelerator is preferably from 0.1 to 15 parts by weight and more preferably from 0.5 to 5 parts by weight per 100 parts by weight of the diene rubber.

The anti-aging agent is not particularly limited, but examples thereof include amine-based anti-aging agents such as 2,2,4-trimethyl-1,2-dihydroquinoline polymers, p,p'-dioctyldiphenylamine, N,N'-diphenyl-p-phenylenediamine, and N-phenyl-N'-1,3-dimethylbutyl-p-phenylenediamine, and phenol-based anti-aging agents such as 2,6-di-t-butyl-4-methylphenol and 2,2'-methylenebis(4-methyl-6-t-butylphenol). These anti-aging agents may each be used alone, or two or more types may be used in combination. The compounded content of the anti-aging agent is preferably from 0.1 to 15 parts by weight and more preferably from 0.5 to 5 parts by weight per 100 parts by weight of the diene rubber.

The processing aid is not particularly limited, but examples thereof include higher fatty acids such as stearic acid, higher fatty acid amides such as stearic acid amide, aliphatic higher amines such as stearyl amine, aliphatic higher alcohols such as stearyl alcohol, partial esters of fatty acids and polyhydric alcohols such as glycerin fatty acid esters, fatty acid metal salts such as zinc stearate, and zinc oxide. The compounded content is selected appropriately, but the compounded contents of higher fatty acids, aliphatic higher amides, higher alcohols, and fatty acid metal salts are preferably from 0.05 to 15 parts by weight and more preferably from 0.5 to 5 parts by weight per 100 parts by weight of the diene rubber. The compounded content of zinc oxide is preferably from 0.05 to 10 parts by weight and more preferably from 0.5 to 3 parts by weight per 100 parts by weight of the diene rubber.

The plasticizer used as a compounding agent is not particularly limited, but an aroma-based, naphthene-based, paraffin-based, or silicone-based extender oil is selected in accordance with the application. The content of the plasticizer used is ordinarily from 1 to 150 parts by weight, preferably from 2 to 100 parts by weight, and even more preferably from 3 to 60 parts by weight per 100 parts by weight of the diene rubber. When the content of the plasticizer used is within this range, the reinforcing agent dispersing effect, tensile strength, wear resistance, heat resistance, and the like are balanced to a high degree. Other examples of plasticizers include diethylene glycol, polyethylene glycol, and silicone oils.

The thermosetting resin is not particularly limited, but examples thereof include resorcin-formaldehyde resins, phenol-formaldehyde resins, urea-formaldehyde resins, melamine-formaldehyde resins, and phenol derivative-formaldehyde resins, and more specifically thermosetting resins which are cured or polymerized via heating or applying heat and a methylene donor such as m-3,5-xylenol-formaldehyde resins and 5-methylresorcin-formaldehyde resins, as well as other resins such as guanamine resins, diallylphthalate resins, vinyl ester resins, phenol resins, unsaturated polyester resins, furan resins, polyimide resins, polyurethane resins, melamine resins, urea resins, and epoxy resins.

The thermoplastic resin is not particularly limited, but examples thereof include general-purpose resins such as polystyrene resins, polyethylene resins, polypropylene resins, polyester resins, polyamide resins, polycarbonate resins, polyurethane resins, polysulfone resins, polyphenylene ether resins, and polyphenylene sulfide resins. Other examples include aromatic hydrocarbon resins such as styrene-α-methylstyrene resins, indene-isopropenyltoluene resins, and coumarone-indene resins, dicyclopentadiene resins, hydrocarbon resins such as petroleum resins containing 1,3-pentadiene, pentene, methylbutene, or the like as a main raw material, alkylphenol resins, modified phenol resins, terpenephenol resins, terpene resins, and aromatic modified terpene resins.

The rubber composition of the present technology achieves and enhances rubber hardness and tensile stress to or beyond conventional levels, and thereby can improve the steering stability of the pneumatic tire to or beyond conventional levels.

The rubber composition of the present technology can be suitably used for a cap tread portion, an undertread portion, a sidewall portion, and a bead filler portion of a pneumatic tire, a coating rubber for a cord such as a carcass layer, a belt layer, or a belt cover layer, a side reinforcing rubber layer with a crescent-shaped cross section in a run-flat tire, a rim cushion portion, or the like. The pneumatic tire using the rubber composition of the present technology for these members improves rubber hardness and tensile stress, and thereby can maintain and enhance steering stability to or beyond conventional levels.

The present technology is further explained below by examples. However, the scope of the present technology is not limited to these examples.

EXAMPLES

Fifteen types of styrene-butadiene copolymer components in which a styrene-butadiene copolymer was used alone or styrene-butadiene copolymers were blended at the compounding ratios shown in Tables 1 and 2, were prepared and the following were measured: (1) the content of bonded styrene; (2) the ratio of the total amount of styrene of an ozone decomposed component S1 including one styrene-derived unit and an ozone decomposed component S1V1 including one styrene-derived unit and one 1,2-bonded butadiene-derived unit to the amount of bonded styrene (S1+S1V1; wt. %) and the ratio of the total amount of styrene of the ozone decomposed component S1V1 including one styrene-derived unit and one 1,2-bonded butadiene-derived unit to the amount of bonded styrene (S1V1; wt. %); (3) the ratio of the integrated intensity of a decomposed component S1V2 including one styrene-derived unit and two 1,2-bonded butadiene-derived units to the integrated intensity of all decomposed components including styrene-derived units (S1V2; %); and (4) the vinyl content of the butadiene portion. In addition, because Nipol 1739, E581, Tufdene 1834, Tufdene 2330, HP755B, NS522, and NS570 are oil extended products, the net compounded amounts of the rubber components are included in parentheses together with the actual compounded amounts.

The (1) content of bonded styrene and (4) vinyl content of the butadiene portion of the styrene-butadiene copolymer components were measured by $^1$H-NMR.

The conditions for the ozone decomposition of the styrene-butadiene copolymer components were as described above. In addition, (2) the ratio of the total amount of styrene of the ozone decomposed component S1 including one styrene-derived unit and the ozone decomposed component S1V1 including one styrene-derived unit and one 1,2-bonded butadiene-derived unit to the amount of bonded styrene (S1+S1V1; wt. %) and the ratio of the total amount of styrene of the ozone decomposed component S1V1 including one styrene-derived unit and one 1,2-bonded butadiene-derived unit to the amount of bonded styrene (S1V1; wt. %) were measured by gel permeation chromatography (GPC). The measurement conditions for gel permeation chromatography (GPC) were as described above. Further, (3) the ratio of the integrated intensity of the decomposed component S1V2 including one styrene-derived unit and two 1,2-bonded butadiene-derived units to the integrated intensity of all the decomposed components including styrene-derived units (S1V2; %) was measured by a liquid chromatography-mass spectrometer (LCMS). The measurement conditions for a liquid chromatography-mass spectrometer (LCMS) were as described above.

Fifteen types of rubber compositions containing the compounding agents shown in Table 3 as common components to be compounded, the styrene-butadiene copolymer components shown in Tables 1 and 2 (single styrene-butadiene copolymer or blend of a plurality of styrene-butadiene copolymers), and the other diene rubbers (Examples 1 to 10 and Comparative Examples 1 to 5) were mixed with components excluding sulfur and the vulcanization accelerator, using a 1.7-L sealed Banbury mixer for 6 minutes and after the mixture was discharged from the mixer at 150° C., the mixture was cooled to room temperature. Then, the mixture was mixed again for 3 minutes using the 1.7-L sealed Banbury mixer and discharged. The sulfur and the vulcanization accelerator were mixed in the mixture using an open roll to obtain a rubber composition. The obtained rubber composition was vulcanized at 160° C. for 30 minutes using a predetermined mold to prepare a vulcanized rubber test piece. The obtained vulcanized rubber test piece was evaluated for rubber hardness at 60° C. and tensile stress by the following measurement methods.

Rubber Hardness at 60° C.

The obtained vulcanized rubber test piece was measured for rubber hardness at 60° C. in accordance with JIS K6253 using a type A durometer. The obtained results are shown in the "Rubber hardness (60° C.)" rows of Tables 1 and 2 as index values with the value of Comparative Example 1 being defined as 100. Greater index values indicate higher rubber hardness, which indicates excellent steering stability when produced into a tire.

Tensile Properties (Tensile Strength at Break and Tensile Elongation at Break)

A dumbbell-shaped JIS No. 3 test piece was prepared in accordance with JIS K6251 from the obtained vulcanized rubber test piece. A tensile test was performed at a tensile test speed of 500 mm/min at room temperature (20° C.), and 100% tensile stress at 100% elongation was measured. The obtained results are shown in the "100% Tensile stress" rows of Tables 1 and 2 as index values with the value of Comparative Example 1 being defined as 100. Greater index values of "100% Tensile stress" indicate greater 100% tensile stress at 100% elongation, which indicates excellent steering stability when produced into a tire.

TABLE 1

|  |  | Comparative Example 1 | Comparative Example 2 | Comparative Example 3 | Comparative Example 4 | Comparative Example 5 |
|---|---|---|---|---|---|---|
| Tufdene 2000R | part by weight |  | 70 | 30 |  |  |
| YO31 | part by weight |  |  |  | 100 |  |
| NS116 | part by weight | 100 | 30 | 70 |  |  |
| Nipol 1739 | part by weight |  |  |  |  | 137.5 100 |
| Oil | part by weight | 37.5 | 37.5 | 37.5 | 37.5 | 0 |
| Bonded styrene content | wt. % | 20.9 | 22.8 | 21.7 | 27.1 | 39.8 |
| Vinyl content | % | 63.8 | 26.0 | 47.6 | 57.5 | 18.4 |
| S1 + S1V1 | wt. % | 65.2 | 69.2 | 66.9 | 55.9 | 45.0 |
| S1V1 | wt. % | 24.7 | 7.4 | 17.3 | 5.5 | 2.0 |
| S1V2 (integrated intensity ratio) | % | 27.8 | 8.3 | 19.5 | 12.4 | 12.5 |
| 100% Tensile stress | Index value | 100 | 62 | 71 | 69 | 122 |

TABLE 1-continued

|  |  | Comparative Example 1 | Comparative Example 2 | Comparative Example 3 | Comparative Example 4 | Comparative Example 5 |
|---|---|---|---|---|---|---|
| Rubber hardness (60° C.) | Index value | 100 | 98 | 99 | 95 | 93 |

TABLE 2

|  |  | Example 1 | Example 2 | Example 3 | Example 4 | Example 5 |
|---|---|---|---|---|---|---|
| E581 | part by weight | 96.25 (70) |  |  | 68.75 (50) |  |
| Tufdene 1834 | part by weight |  |  |  |  |  |
| Tufdene 2330 | part by weight |  |  |  |  |  |
| YO31 | part by weight | 30 |  | 50 | 50 |  |
| HPR850 | part by weight |  |  |  |  | 30 |
| HP755B | part by weight |  | 96.25 (70) | 68.75 (50) |  |  |
| NS522 | part by weight |  |  |  |  |  |
| NS570 | part by weight |  |  |  |  |  |
| 5270H | part by weight |  |  |  |  |  |
| 5260H | part by weight |  |  |  |  |  |
| Nipol 1739 | part by weight |  | 41.25 (30) |  |  | 96.25 (70) |
| NR | part by weight |  |  |  |  |  |
| BR | part by weight |  |  |  |  |  |
| Oil | part by weight | 11.25 | 0 | 18.75 | 18.75 | 11.25 |
| Bonded styrene content | wt. % | 33.5 | 39.6 | 33.3 | 31.7 | 36.0 |
| Vinyl content | % | 46.9 | 33.1 | 48.5 | 49.9 | 30.5 |
| S1 + S1V1 | wt. % | 40.5 | 64.0 | 64.1 | 44.9 | 50.7 |
| S1V1 | wt. % | 8.0 | 8.8 | 8.6 | 7.3 | 7.5 |
| S1V2 (integrated intensity ratio) | % | 19.4 | 18.4 | 16.7 | 17.4 | 15.8 |
| 100% Tensile stress | Index value | 108 | 110 | 105 | 103 | 118 |
| Rubber hardness (60° C.) | Index value | 106 | 101 | 106 | 102 | 100 |

|  |  | Example 6 | Example 7 | Example 8 | Example 9 | Example 10 |
|---|---|---|---|---|---|---|
| E581 | part by weight |  | 96.25 (70) | 96.25 (70) |  |  |
| Tufdene 1834 | part by weight |  |  |  |  | 33 (24) |
| Tufdene 2330 | part by weight |  |  |  |  | 77 (56) |
| YO31 | part by weight |  |  |  |  |  |
| HPR850 | part by weight |  |  |  |  |  |
| HP755B | part by weight | 33 (24) |  |  |  |  |
| NS522 | part by weight | 77 (56) |  |  |  |  |
| NS570 | part by weight |  |  |  | 75 (60) |  |
| 5270H | part by weight |  |  | 30 |  |  |

TABLE 2-continued

| | | | | | | |
|---|---|---|---|---|---|---|
| 5260H | part by weight | | 30 | 40 | | |
| Nipol 1739 | part by weight | | | | | |
| NR | part by weight | | | | | 20 |
| BR | part by weight | 20 | | | | |
| Oil | part by weight | 7.5 | 11.25 | 11.25 | 22.5 | 7.5 |
| Bonded styrene content | wt. % | 39.3 | 33.7 | 31.5 | 35.5 | 23.7 |
| Vinyl content | % | 41.4 | 46.2 | 48.8 | 41.2 | 23.0 |
| S1 + S1V1 | wt. % | 63.1 | 36.0 | 38.4 | 57.1 | 52.0 |
| S1V1 | wt. % | 9.8 | 8.4 | 7.6 | 7.7 | 9.5 |
| S1V2 (integrated intensity ratio) | % | 17.5 | 18.3 | 25.6 | 20.6 | 15.4 |
| 100% Tensile stress | Index value | 112 | 112 | 113 | 116 | 102 |
| Rubber hardness (60° C.) | Index value | 102 | 102 | 104 | 103 | 130 |

The types of raw materials used in Tables 1 and 2 are described below.

Tufdene 2000R: Tufdene 2000R manufactured by Asahi Kasei Chemicals Corporation, bonded styrene content: 23.6 wt. %, vinyl content: 9.8%, non-oil extended product YO31: Asaprene YO31 manufactured by Asahi Kasei Chemicals Corporation, bonded styrene content: 27.1 wt. %, vinyl content: 57.5%, non-oil extended product NS116: NS116 manufactured by Zeon Corporation, bonded styrene content: 20.9 wt. %, vinyl content: 63.8%, non-oil extended product Nipol 1739: Nipol 1739 manufactured by Zeon Corporation, bonded styrene content: 39.8 wt. %, vinyl content: 18.4%, oil extended product prepared by adding 37.5 parts by weight of an oil component to 100 parts by weight of SBR E581: E581 manufactured by Asahi Kasei Chemicals Corporation, bonded styrene content: 35.6 wt. %, vinyl content: 41.3%, oil extended product prepared by adding 37.5 parts by weight of an oil component to 100 parts by weight of SBR Tufdene 1834: Tufdene 1834 manufactured by Asahi Kasei Chemicals Corporation, bonded styrene content: 18.8 wt. %, vinyl content: 10.2%, oil extended product prepared by adding 37.5 parts by weight of an oil component to 100 parts by weight of SBR Tufdene 2330: Tufdene 2330 manufactured by Asahi Kasei Chemicals Corporation, bonded styrene content: 25.8 wt. %, vinyl content: 28.5%, oil extended product prepared by adding 37.5 parts by weight of an oil component to 100 parts by weight of SBR HPR850: HPR850 manufactured by JSR Corporation, bonded styrene content: 27.0 wt. %, vinyl content: 58.8%, non-oil extended product HP755B: HP755B manufactured by JSR corporation, bonded styrene content: 39.6 wt. %, vinyl content: 39.4%, oil extended product prepared by adding 37.5 parts by weight of an oil component to 100 parts by weight of SBR NS522: NS522 manufactured by Zeon Corporation, bonded styrene content: 39.2 wt. %, vinyl content: 42.2%, oil extended product prepared by adding 37.5 parts by weight of an oil component to 100 parts by weight of SBR NS570: NS570 manufactured by Zeon Corporation, bonded styrene content: 40.6 wt. %, vinyl content: 19.0%, oil extended product prepared by adding 25 parts by weight of an oil component to 100 parts by weight of SBR 5270H: 5270H manufactured by Korea Kumho Petrochemical Co., Ltd., bonded styrene content: 20.6 wt. %, vinyl content: 63.6%, non-oil extended product 5260H: 5260H manufactured by Korea Kumho Petrochemical Co., Ltd., bonded styrene content: 27.9 wt. %, vinyl content: 55.0%, non-oil extended product NR: Natural rubber, TSR20

BR: Polybutadiene rubber; Nipol BR1220, manufactured by Zeon Corporation

Oil: Extract No. 4S, manufactured by Showa Shell Sekiyu K.K.

TABLE 3

| Common formulation of rubber composition | |
|---|---|
| Silica | 70.0 part by weight |
| Silane coupling agent | 5.6 part by weight |
| Carbon black | 5.0 part by weight |
| Zinc oxide | 3.0 part by weight |
| Stearic acid | 2.0 part by weight |
| Anti-aging agent | 1.5 part by weight |
| Wax | 1.0 part by weight |
| Sulfur | 1.5 part by weight |
| Vulcanization accelerator 1 | 1.7 part by weight |
| Vulcanization accelerator 2 | 2.0 part by weight |

The types of raw materials used as per Table 3 are described below.

Silica: Nipsil AQ manufactured by Nippon Silica Co., Ltd.

Silane coupling agent: sulfide-based silane coupling agent, Si69VP manufactured by Degussa Carbon black: Shoblack N339M, manufactured by Showa Cabot K.K.

Zinc oxide: Zinc Oxide III manufactured by Seido Chemical Industry Co., Ltd.

Stearic acid: stearic acid manufactured by NOF Corporation

Anti-aging agent: Santoflex 6PPD manufactured by Solutia Europe

Wax: paraffin wax, manufactured by Ouchi Shinko Chemical Industrial Co., Ltd.

Sulfur: oil-treated sulfur manufactured by Karuizawa Refinery Ltd.

Vulcanization accelerator 1: Sanceller CM-PO(CZ) manufactured by Sanshin Chemical Industry Co., Ltd.

Vulcanization accelerator 2: Sanceller D-G (DPG) manufactured by Sanshin Chemical Industry Co., Ltd.

As is clear from Table 2, the rubber compositions of Examples 1 to 10 achieved and enhanced rubber hardness at 60° C. and 100% tensile stress to or beyond conventional levels.

In the styrene-butadiene copolymer component of the rubber composition of Comparative Example 2, the ratio of the integrated intensity of the ozone decomposed product including one styrene-derived unit and two 1,2-bonded butadiene-derived units (S1V2) was less than 15%, and thus the rubber hardness at 60° C. and 100% tensile stress decreased.

In the styrene-butadiene copolymer component of the rubber composition of Comparative Example 3, the ratio of the total amount of styrene of the ozone decomposed product including one styrene-derived unit and one 1,2-bonded butadiene-derived unit to the amount of bonded styrene (S1V1) was not less than 10 wt. %, and thus 100% tensile stress was inferior.

In the styrene-butadiene copolymer component of the rubber composition of Comparative Example 4, the vinyl content of the butadiene portion was not less than 50%, and the ratio of the integrated intensity of the ozone decomposed product including one styrene-derived unit and two 1,2-bonded butadiene-derived units (S1V2) was less than 15%, and thus 100% tensile stress was inferior.

In the styrene-butadiene copolymer component of the rubber composition of Comparative Example 5, the vinyl content of the butadiene portion was less than 20%, and the ratio of the integrated intensity of the ozone decomposed product including one styrene-derived unit and two 1,2-bonded butadiene-derived units (S1V2) was less than 15%, and thus rubber hardness at 60° C. was inferior.

The invention claimed is:

1. A rubber composition comprising a diene rubber including at least one styrene-butadiene copolymer and a reinforcing filler, wherein a styrene-butadiene copolymer component including the at least one styrene-butadiene copolymer has the characteristics of (1) to (4):

(1) a content of bonded styrene is from 5 to 50 wt. %;

(2) when a decomposed component Si including one styrene-derived unit and a decomposed component S1V1 including one styrene-derived unit and one 1,2-bonded butadiene-derived unit are measured by gel permeation chromatography as decomposed components obtained by ozone decomposition, a total content of styrene of the decomposed component S1 and the decomposed component S1V1 is less than 80 wt. % of the amount of bonded styrene, and a total content of styrene of the decomposed component S1V1 is less than 10 wt. % of the amount of bonded styrene;

(3) when the decomposed components obtained by ozone decomposition are measured by a liquid chromatography-mass spectrometer, an integrated intensity of a decomposed component S1V2 including one styrene-derived unit and two 1,2-bonded butadiene-derived units is not less than 15% of an integrated intensity of all the decomposed components including styrene-derived units; and (4) a vinyl content of a butadiene portion is not less than 20% and less than 50%;

wherein the decomposed component S1 is represented by following general formula (I):

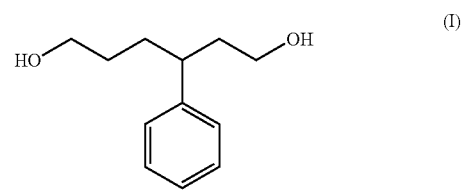

the decomposed component S1V1 is represented by at least one selected from following general formulae (II) and (III):

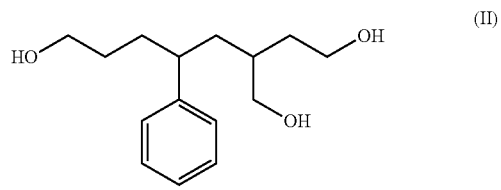

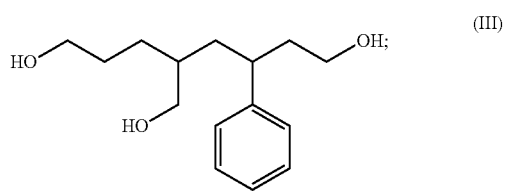

and the decomposed component S1V2 is represented by at least one selected from following general formulae (IV) through (VI):

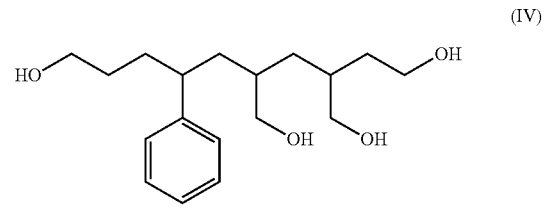

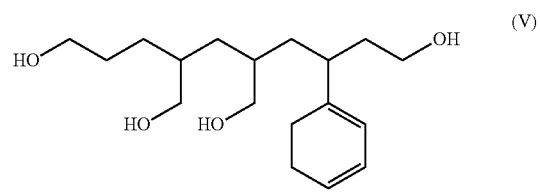

-continued

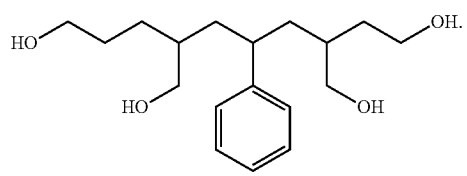
(VI)

2. The rubber composition according to claim 1, wherein the diene rubber further contains at least one selected from natural rubber, polyisoprene, and polybutadiene.

3. The rubber composition according to claim 1, wherein the reinforcing filler is at least one selected from silica and carbon black.

4. A pneumatic tire using the rubber composition according to claim 1.

5. The pneumatic tire according to claim 4, wherein the rubber composition is used in a cap tread.

6. The rubber composition according to claim 2, wherein the reinforcing filler is at least one selected from silica and carbon black.

7. A pneumatic tire using the rubber composition according to claim 6.

8. The pneumatic tire according to claim 7, wherein the rubber composition is used in a cap tread.

* * * * *